United States Patent
Mogami et al.

Patent Number: 5,684,071
Date of Patent: Nov. 4, 1997

[54] ADDITIVE FOR THERMPOLASTIC RESINS AND FLAME RETARDANT RESIN COMPOSITION

[75] Inventors: Kenji Mogami; Masaaki Nakamura, both of Settsu; Tadashi Koyama, Amagasaki; Tomomi Nakashima, Settsu; Akiyoshi Somemiya, Kobe, all of Japan

[73] Assignee: Kanegafuchi Kagaku Kogyo Kabushiki Kaisha, Osaka, Japan

[21] Appl. No.: 670,141

[22] Filed: Jun. 27, 1996

Related U.S. Application Data

[63] Continuation of Ser. No. 364,292, Dec. 27, 1994, abandoned.

[30] Foreign Application Priority Data

Dec. 28, 1993 [JP] Japan .................... 5-338035
Dec. 28, 1993 [JP] Japan .................... 5-338036

[51] Int. Cl.$^6$ ........................... C08K 5/34
[52] U.S. Cl. .............. 524/100; 524/91; 524/96; 524/101; 524/125; 524/416; 423/205; 423/209
[58] Field of Search .............. 524/91, 96, 100, 524/101, 125, 416; 423/205, 209

[56] References Cited

U.S. PATENT DOCUMENTS

| | | | |
|---|---|---|---|
| 3,993,623 | 11/1976 | Moedritzer et al. | 524/125 |
| 4,134,876 | 1/1979 | Horner et al. | 260/45.7 |
| 4,180,496 | 12/1979 | Yanagimoto et al. | 260/45.8 |
| 4,203,888 | 5/1980 | Rashbrook | 260/45.7 |
| 4,670,483 | 6/1987 | Hall et al. | 523/179 |
| 5,047,459 | 9/1991 | Walde | 524/100 |
| 5,312,853 | 5/1994 | Staendeke et al. | 524/100 |
| 5,331,030 | 7/1994 | Cipolli et al. | 524/416 |

FOREIGN PATENT DOCUMENTS

| | | |
|---|---|---|
| 0492139 | 11/1991 | European Pat. Off. . |
| 4101874 | 3/1990 | Germany . |
| 51-19858 | 6/1976 | Japan . |
| 51-39271 | 10/1976 | Japan . |
| 54-112958 | 9/1979 | Japan . |
| 59-50184 | 12/1984 | Japan . |
| 3-281652 | 12/1991 | Japan . |
| 5-70671 | 3/1993 | Japan . |
| 5-287119 | 11/1993 | Japan . |
| 6-157880 | 6/1994 | Japan . |

OTHER PUBLICATIONS

European Search Report for Application No. EP 94 12 0485.

*Primary Examiner*—Kriellion S. Morgan
*Attorney, Agent, or Firm*—Varndell Legal Group

[57] ABSTRACT

An additive having an improved dispersibility or adhesion property to thermoplastic resins and useful for imparting an excellent flame resistance and other properties thereto without deteriorating properties that the thermoplastic resins originally possess, such as mechanical, electrical and thermal properties and molding processability, which comprises a nitrogen-containing heterocyclic compound or its salt surface-treated with 0.1 to 50% by weight of a compound having at least two functional groups such as epoxy resin, acid anhydride or the like; and a flame retardant polyester resin composition comprising (A) a thermoplastic polyester, (B) a nitrogen-containing heterocyclic compound or its salt, (C) a compound having at least two functional groups and optionally (D) a phosphorus based flame retarder, which may be prepared by adding the component (B) previously surface-treated with the component (C) or separately adding the components (B) and (C) to the polyester (A).

22 Claims, No Drawings

ADDITIVE FOR THERMPOLASTIC RESINS AND FLAME RETARDANT RESIN COMPOSITION

This application is a continuation application of Ser. No. 08/364,292, filed Dec. 27, 1994, now abandoned.

BACKGROUND OF THE INVENTION

The present invention relates to an additive for thermoplastic resins which is improved in dispersibility into and adhesion to thermoplastic resins, and more particularly to an additive for thermoplastic resins which can impart excellent properties, such as flame resistance, electric properties, lubricity, plasticity, coloring property, surface smoothness and dyability, to thermoplastic resins and which can provide molded articles having good mechanical properties, heat resistance and moisture resistance. The present invention also relates to a flame retardant polyester resin composition which can exhibit an excellent flame resistance without using a halogen based flame retardant and a process for the preparation thereof, and more particularly a flame retardant polyester resin composition having an excellent flame resistance and good properties such as mechanical properties, heat resistance, moisture resistance, molding processability, heat stability in addition to electric properties, lubricity, plasticity, coloring property, surface smoothness and dyability and a process for the preparation thereof.

It is known that heterocyclic compounds such as melamine, cyanuric acid, melamine cyanurate, guanamine, guanine and purine impart properties such as flame resistance, electric properties, lubricity, plasticity, coloring property, surface smoothness and dyability to thermoplastic resins, as disclosed for instance in Japanese Patent Publication Kokoku No. 42-19941, No. 48-39778 and No. 60-33850 and Japanese Patent Publication Kokai No. 50-105744, No. 53-31759 and 62-236853.

However, these additives do not have a sufficient flame retarding property and are relatively poor compatibility with thermoplastic resins. Therefore, if they are used in a large amount in order to impart the above properties to thermoplastic resins in a high level, properties that the resins originally possess are impaired. For example, the mechanical properties, heat resistance, moisture resistance and molding processability of the resins are deteriorated.

In order to eliminate these defects of the heterocyclic compound additives, various proposals have hitherto been made. For instance, Japanese Patent Publication Kokai No. 54-112958 discloses a process for imparting a flame resistance to a polyester without impairing mechanical properties by adding a carboxylic acid ester of a compound having a triazine skeleton as a dispersing agent to a composition containing the polyester and melamine cyanurate. However, this proposal still has the problem that mechanical properties and the like are markedly decreased if the amount of the additive is increased for the purpose of obtaining a high degree of flame resistance.

Also, Japanese Patent Publication Kokai No. 59-230055 discloses imparting a flame resistance to polyamide without impairing the molding processability by incorporating a reaction product of melamine cyanurate with an organic basic compound into the polyamide. The molding processability is indeed improved by this proposal. However, no degree of improvement in flame resistance and mechanical properties is described, and it is implicitly suggested that it is still difficult to obtain a high degree of flame resistance by this proposal.

On the other hand, thermoplastic polyesters, typically polyalkylene terephthalates, have been widely used in parts of electric and electronic apparatuses and parts of automobiles in view of their excellent properties. In particular, the polyesters used in the parts of electric and electronic apparatuses are flame-retarded in many cases in order to secure safety against fire.

Halogen type flame retarders have been generally used to impart flame retardancy to thermoplastic polyester resins. The halogen type flame retarders have the disadvantage that they are partially decomposed at the time of mixing or molding to generate a free halogen gas or a halogen compound, thus resulting in corrosion of the surface of a mold or a cylinder of a mixing machine for compounding, or resulting in corrosion of metallic parts of electric or electronic apparatuses or occurrence of contact fault or conduction fault thereof. Further, some of the halogen type flame retarders generate a gas containing a toxic substance by decomposition although it is a slight amount. Accordingly, the use of non-halogen type flame retarders is desired.

It is proposed to use a heterocyclic compound such as melamine cyanurate (e.g. Japanese Patent Publication Kokai No. 50-105744 and Japanese Patent Publication Kokoku No. 60-33850) or a combination of melamine cyanurate with a carboxylic acid ester of a compound having a triazine skeleton (Japanese Patent Publication Kokai No. 54-112958) as a flame retarder for thermoplastic polyesters. As discussed above, however, these flame retarder have the disadvantages that the flame retarding property is not sufficiently high and they can not impart a satisfactory flame resistance to thermoplastic polyesters without deteriorating other properties such as mechanical properties.

It is an object of the present invention to provide an additive useful for improving flame resistance, electric property, lubricity, plasticity, easiness of pigmentation, surface smoothness and dyability of thermoplastic without resins impairing mechanical properties, heat resistance, moisture resistance and molding processability.

A further object of the present invention is to provide an additive particularly suitable for thermoplastic polyester resins, which can impart a high degree of flame resistance and other good properties such as electric properties, lubricity, plasticity, easiness of pigmentation, surface smoothness and dyability to the polyester resins without impairing mechanical properties, heat resistance, moisture resistance, molding processability and heat stability.

A still further object of the present invention is to provide a non-halogen type flame retarder suitable for thermoplastic resins, which has an excellent flame retarding property and an improved compatibility with thermoplastic resins.

Another object of the present invention is to provide a flame retardant polyester resin composition which has good properties such as lubricity, plasticity, easiness of pigmentation, dyability, molding processability and thermal stability and provides molded articles having a high flame resistance and other good properties such as electric properties, surface smoothness, mechanical properties, heat resistance and moisture resistance.

These and other objects of the present invention will become apparent from the description hereinafter.

SUMMARY OF THE INVENTION

It has been found that the compatibility or affinity of nitrogen-containing heterocyclic compounds or their derivatives with thermoplastic resins can be improved by previously surface-treating them with or using them in combination with a compound having at least two functional groups such as epoxy group, acid anhydride group, isocyanate group, oxazoline group or carbodiimido group.

In accordance with the present invention, there is provided an additive suitable for use in thermoplastic resins which comprises a substance containing a heterocyclic compound containing a nitrogen atom, said substance being surface-treated with a compound having at least two functional groups. The term "substance containing a heterocyclic compound containing a nitrogen atom" or "substance contaning a nitrogen-containing heterocyclic compound" as used herein comprehends the heterocyclic compound itself, a salt of the heterocyclic compound with other compound such as an acid or a base and a salt of two kinds of the heterocyclic compounds.

Since the additive according to the present invention has an improved compatibility or affinity with thermoplastic resins, the heterocyclic compounds or their salts effectively exhibit their functions to impart flame resistance, electric properties, lubricity, plasticity, easiness of pigmentation, surface smoothness or dyability mechanical properties, heat resistance, moisture resistance, molding processability and other preperties of the thermoplastic resins even if the additive is used in a large amount.

The additive according to the present invention is prepared by surface-treating at least one member selected from the group consisting of a nitrogen-containing heterocyclic compound with other compound and a salt of two kinds of the heterocyclic compound with a compound having at least two funtional groups in a usual surface-treating manner as adopted for surface treatment of inorganic fillers.

The nitrogen-containing heterocyclic compounds or their salts themselves have a flame retarding effect, but they may be used in combination with known flame retarders. According to the present invention, a high flame resistance can be imparted to thermoplastic resins by using the heterocyclic compounds or their salts in combination with other known flame retarders with minimizing deterioration of mechanical properties, heat resistance, moisture resistance and other properties resulting from the use of the know flame retarders.

The present invention also provides a flame retardant polyester resin composition have an excellent flame resistance and excellent other properties such as mechanical properties, which comprises (A) a thermoplastic polyester, (B) a heterocyclic compound containing a nitrogen atom or a salt thereof, (C) a compound having at least two functional groups, and (D) a phosphorus based flame retarder.

DETAILED DESCRIPTION

The nitrogen-containing heterocyclic compounds are compounds represented by a nitrogen-containing five-membered heterocyclic compound and a nitrogen-containing six-membered heterocyclic compound. Examples of the nitrogen-containing five membered heterocyclic compound are, for instance, pyrrole compounds, indole compounds, isoindole compounds, oxazole compounds, isooxazole compounds, thiazole compounds, imidazole compounds, pyrazole compounds, oxadiazole compounds, thiadiazole compounds, triazole compounds, tetrazole compounds, and derivatives thereof. Examples of the nitrogen-containing six-membered heterocyclic compound are, for instance, oxazine compounds, thiazine compounds, pyridazine compounds, pyrimidine compounds, pyrazine compounds triazine compounds, tetrazine compounds, and derivatives thereof.

The nitrogen-containing heterocyclic compounds may be used alone or in admixture thereof.

Representative examples of the nitrogen-containing heterocyclic compounds are, for instance, a compound of the formula (I):

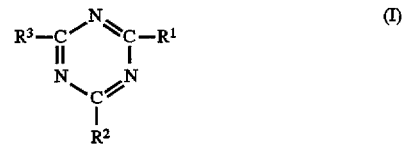

wherein $R^1$, $R^2$ and $R^3$ may be the same or different and each is hydrogen atom, amino group, an aryl group (e.g. phenyl group, tolyl group, biphenyl group, naphthyl group or phenanthryl group) or a hydroxyalkyl group having 1 to 3 carbon atoms (e.g. —$CH_2OH$, —$CH_2CH_2OH$ or —$CH(CH_3)CH_2OH$), such as melamine, guanamine, benzoguanamine, triphenyltriazine or diaminophenyltriazine; a compound of the formula (II):

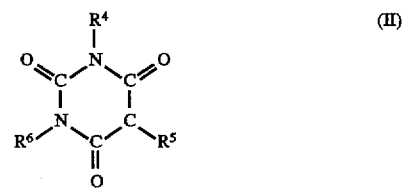

wherein $R^4$, $R^5$ and $R^6$ may be the same or different and each is hydrogen atom, amino group, an aryl group (e.g. phenyl group, tolyl group, biphenyl group, naphthyl group or phenanthryl group) or a hydroxyalkyl group having 1 to 3 carbon atoms (e.g. —$CH_2OH$, —$CH_2CH_2OH$ or —$CH(CH_3)CH_2OH$), such as cyanuric acid, isocyanuric acid, triphenyl cyanurate or trisphenylisocyanurate; a compound of the formula (III):

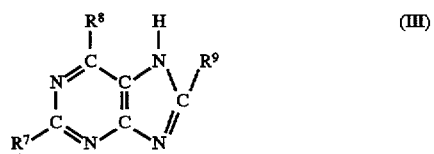

wherein $R^7$, $R^8$ and $R^9$ may be the same or different and each is hydrogen atom, amino group, hydroxyl group, mercapto group, an alkylamino group having 1 to 10 carbon atoms (e.g. methylamino group, dimethylamino group or n-decylamino group), anilino group, morpholino group, hydrazino group, benzylamino group, pyridylamino group, thenylamino group or a hydroxyalkyl group having 1 to 3 carbon atoms (e.g. —$CH_2OH$, —$CH_2CH_2OH$ or —$CH(CH_3)CH_2OH$), such as purine ($R^7,R^8,R^9$=H in formula III), hypoxanthine ($R^7,R^9$=H and $R^8$=OH in formula III), xanthine ($R^9$=H and $R^7,R^8$=OH in formula III), uric acid ($R^7$, $R^8,R^9$=OH in formula III), adenine ($R^7,R^9$=H and $R^8$=amino group in formula III), guanine ($R^9$=H, $R^8$=OH and $R^7$=amino group in formula III) or isoguanine ($R^9$=H, $R^7$=OH and $R^8$=amino group in formula III); a pyrimidinol compound such as cytosine, uracil or thymine; a benzotriazole compound such as benzotriazole or phenylbenzotriazole; and a benzoimidazole such as 2-phenylbenzoimidazole or 2-vinylbenzoimidazole; and a salt of a nitrogen-containing heterocyclic compound with another nitrogen-containing heterocyclic compound such as melamine cyanurate (adduct of melamine with cyanuric acid and/or its tautomer, preferably adduct of equimolar amounts of these compounds) or benzoguanamine urate.

Salts of the heterocyclic compound with other compounds can be used in the present invention. Such salts include salts of basic N-containing heterocyclic compounds with acids, e.g. inorganic acids such as phosphoric acid, phosphonic acid, phosphinic acid, sulfonic acid, sulfamic acid and silicic acid, wherein phosphoric acid and silicic acid may be condensates of two or more molecules such as polyphosphoric acid and polysilicic acid. Representative examples of such salts are, for instance, melamine phosphate (salt of phosphoric acid and melamine in a molar ratio of 3:1 to 1:3), guanamine phosphate (salt of phosphoric acid and guanamine in a molar ratio of 2:1 to 1:3 ), melamine metaphosphate (salt of metaphosphoric acid and melamine in a molar ratio of 3:1 to 1:4) and melamine nitrilotris(methylene) phosphonate (salt of nitrilotris(methylene)phosphonic acid and melamine in a molar ratio of 3:1 to 1:6).

It is desirable that the nitrogen-containing heterocyclic compound or salt thereof itself has a good heat stability and does not decrease the molding processability and physical properties of thermoplastic resins. From such points of view, the heterocyclic compound or its salt used is preferably a fine powder having an average particle size of 0.01 to 100 µm, especially 0.5 to 10 µm, which is in a solid state at a processing temperature of thermoplastic resins.

Examples of such a compound which is solid at a processing temperature for thermoplastic resins are, for instance, melamine, cyanuric acid, melamine cyanurate, guanamine, guanine and purine. A fine powder of these compounds having an average particle size of 0.01 to 100 µm, especially 0.5 to 10 µm, is preferably used in the present invention. Melamine cyanurate is particularly preferred, since the thermal stability is good.

A salt of the heterocyclic compound such as melamine cyanurate or melamine phosphate can be prepared, for instance, in such a manner as mixing a solution of a basic compound and a solution of an acidic compound to form a salt, or adding and dissolving either a basic compound or an acidic compound in a solution of the other to form a salt, separating the precipitated salt and removing the solvent. The mixing ratio of the basic compound and the acidic compound is not particularly limited, but it is desirable that the pH of the resulting salt in water is approximately neutral (i.e. pH 6 to 8), in other words, a salt is formed from approximately equimolar amounts (especially 1:1) of acidic and basic compounds, in order to prevent deterioration of the thermal stability of thermoplastic resins to be incorporated with the salt. The solvent used is preferably water, but an organic solvent miscible with water may be used, e.g. a lower alkyl alcohol, acetone, methyl ethyl ketone, tetrahydrofuran or dimethylformamide. The temperature for the salt formation is optional, and if the heterocyclic compound is hard to dissolve at room temperature, the temperature may be raised to a temperature of about 40° to about 100° C.

The additive for thermoplastic resins according to the present invention is obtained by subjecting the heterocyclic compound or its salt to surface treatment with a compound having at least two functional groups. The functional group-containing compound serves to improve the affinity or compatibility of the heterocyclic compound or its salt with thermoplastic resins, thus improving the dispersibility and adhesion of the heterocyclic compound or its salt.

Preferable functional group of the compound having at least two functional groups includes, for instance, epoxy group, carboxylic acid anhydride group, isocyanata group, oxazoline group, carbodiimido group, aldehyde group, carboxyl group, aziridinyl group (ethyleneimine group), and cyanate group. From the viewpoint of bonding or adhesion between the heterocyclic compound or its salt and the thermoplastic resins, epoxy group, acid anhydride group, isocyanate group and oxazoline group are particularly preferred. The functional groups included in the compound may be those of the same kind or those of two or more different kinds.

From the viewpoint of bonding or adhesion between the heterocyclic compound or its salt and the thermoplastic resin, it is necessary that the number of functional groups is at least two, and compounds having two or three functional groups are preferred.

The molecular weight of the functional group-containing compound is not particularly limited, but is preferably from about 100 to about 1,000 from the viewpoint of bonding or adhesion between the heterocyclic compound or its salt and the thermoplastic resin. Also, it is preferable from the viewpoint of workability that the functional group-containing compound is a liquid having a viscosity of at most 1,000 poises at ordinary temperature or a powder at ordinary temperature.

Examples of the functional group-containing compound are, for instance, an epoxy resin such as bisphenol A epoxy resin, biphenyl epoxy resin, phenol novolac epoxy resin or polyglycidylamine epoxy resin, a diglycidyl compound such as resorcinol diglycidyl ether or diglycidyl terephthalate, and other two or more epoxy group-containing compounds; an acid anhydride such as pyromellitic anhydride or mellitic anhydride, and other compounds having at least two acid anhydride groups; a diisocyanate compound such as phenylene diisocyanate, tolylene diisocyanate or naphthalene diisocyanate, and other isocyanate compounds; a bisoxazone compound such as 2,2'-(1,3-phenylene)-bis(2-oxazoline) or 2,2'-(1,4-phenylene)-bis(2-oxazoline), and other compounds having at least two oxazoline groups; a carbodiimide compound derived from phenylene diisocyanate or toluene diisocyanate, and other compounds having at least two carbodiimido groups; a dialdehyde compound such as 1,4-dialdehyde benzene, and other compounds having at least two aldehyde groups; a dicarboxylic acid such as terephthalic acid or diphenic acid, and other carboxylic acid compounds having at least two carboxyl groups; a compound having at least two aziridinyl groups such as trisaziridinylphosphine oxide or trimethylolpropane-tri-β-aziridinylpropionate; and the like.

The amount of the functional group-containing compound varies depending on the kind of the heterocyclic compound or its salt to be treated, but is usually from 0.1 to 50% by weight, preferably 0.5 to 30% by weight, based on the heterocyclic compound or its salt. If the amount is less than 0.1% by weight, little or no effect is obtained. If the amount is more than 50% by weight, workability and molding processability of thermoplastic resins are remarkably reduced.

Judging a combination of the heterocyclic compound or its salt and the functional group-containing compound from the viewpoint that the effects of the present invention are favorably exhibited overall, preferred are a combination of melamine cyanurate and an epoxy compound, a combination of melamine cyanurate and carboxylic acid dianhydride, melamine cyanurate and a bisoxazoline compound, a combination of melamine cyanurate and a polycarbodiimide, a combination of melamine cyanurate and a diisocyanate compound, a combination of melamine phosphate and acid anhydride and a combination of melamine phosphate and bisoxazoline.

The process for preparing the additive according to the present invention is not particularly limited. The treatment of the nitrogen-containing heterocyclic compound or its salt with the functional group-containing compound can be made in various manners as adopted for surface treatment of usual inorganic fillers or the like. For example, the heterocyclic compound or its salt is mixed with the functional group-containing compound or its solvent solution for 2 to 20 minutes, especially 5 to 20 minutes by a mixing machine such as a high speed mixer, a flash mixer, an air blender, a ribbon blender, a double conical mixer, a V-shaped mixer, a pug mixer or a rotary mixer, and is optionally dried to give the additive of the present invention. The additive of the present invention can also be obtained by dispersing the heterocyclic compound or its salt in a solvent to form a slurry, adding the functional group-containing compound to the slurry with stirring, and mixing them by a mixing machine followed by separation and drying of the resultant. Further, it is possible to obtain the additive of the present invention by spraying a solvent solution of the functional group-containing compound onto the heterocyclic compound or its salt heated at an elevated temperature. Other methods suitable for coating the surface of particles of the heterocyclic compound or its salt with the functional group-containing compound are of course adoptable. Mixing of the both compounds by a high speed mixer is preferably adopted, since the operation is easy and simple. The thus obtained additive of the present invention is a fine powder, preferably a powder having an average particle size of 0.01 to 100 μm, especially 0.5 to 10 μm.

The additive of the present invention may contain a lubricant, a plasticizer or other usual additives used for preparing the additive of the invention.

The additive of the present invention is applicable to any of so-called thermoplastic resins without any restriction, but is particularly suitable for use in a polyester such as polyethylene terephthalate or polybutylene terephthalate, a polyamide such as nylon 6 or nylon 66, a polycarbonate such as bisphenol A polycarbonate, and a polyphenylene oxide such as poly(2,6-dimethylphenylene oxide). These thermoplastic resins may be copolymerization products with other comonomers, or may be in the form of a polymer blend.

The additive of the present invention, namely the surface-treated heterocyclic compound or its salt, is used in such an amount that the amount of the heterocyclic compound or its salt is from 2 to 50% by weight, preferably 5 to 40% by weight, more preferably 10 to 30% by weight, based on a thermoplastic resin, although it varies depending on the kind of heterocyclic compound or the content of nitrogen atom in the additive, the kind of the thermoplastic resin to be improved, the properties to be imparted to the thermoplastic resin or their levels of improvement. If the amount is less than 2% by weight, properties such as flame resistance, electric properties, lubricity, coloring property and surface smoothness are not sufficiently improved. If the amount is more than 50% by weight, properties that the thermoplastic resin originally possesses, such as mechanical properties, tend to deteriorate.

The additive of the present invention may be used in combination with other known flame retarders, such as a phosphorus based flame retarder, a halogen based flame retarder, an antimony based flame retarder or other inorganic flame retarders, in order to impart a further improved flame resistance to thermoplastic resins while maintaining good mechanical properties, heat resistance and moisture resistance, or in order to substitute it for a part of other flame retarders in known uses to thereby minimize the deterioration of mechanical properties, heat resistance or moisture resistance owing to the use of flame retarders while maintaining the desired flame resistance.

The use of the additive according to the present invention in combination with a phosphorus based flame retarder can provide a high degree of flame resistance with minimizing the deterioration of mechanical properties and the like and, therefore, it is very useful as a non-halogen flame retarder.

Any of phosphorus based flame retarders can be used in the present invention, so long as their are stable such that they do not decompose during molding processing of thermoplastic resins. The phosphorus based flame retarders include organic phosphorus compounds such as phosphoric acid ester or phosphonic acid ester with an alcohol or phenol compound having a linear or branched aliphatic, aromatic or alicyclic group with 1 to 12 carbon atoms, preferably 1 to 8 carbon atoms, nitrogen-containing organic phosphorus compounds, and inorganic phosphorus compounds.

Representative examples of the phosphorus based flame retarder are, for instance, a phosphoric acid monoester such as triphenyl phosphate, tricresyl phosphate, cresyldiphenyl phosphate or octyldiphenyl phosphate, ammonium polyphosphate, polyphosphoric acid amide, red phosphorus, guanidine phosphate, dialkylhydroxymethyl phosphonate, and a condensed phosphoric acid ester.

A condensed phosphoric acid ester represented by formula (V) is preferable in that it is low volatile and thermally stable in molding processing of thermoplastic resins and it is hard to impair the thermal stability and physical properties of the resins;

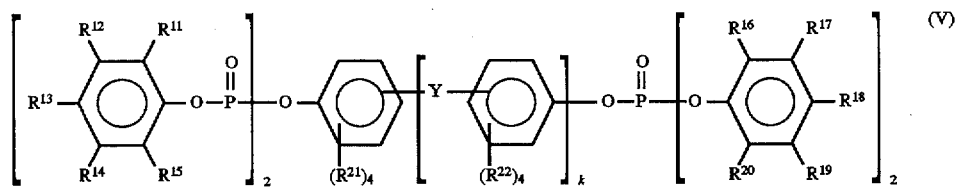

wherein $R^{11}$ to $R^{22}$ are independently hydrogen atom or an alkyl group having 1 to 4 carbon atoms such as —$CH_3$, —$C_2H_5$, —$C_3H_7$, —$CH(CH_3)_2$ or —$C(CH_3)_3$; Y is a single bond, an alkylene group having 1 to 3 carbon atoms such as —$CH_2$—, —$CH_2CH_2$—, —$CH(CH_3)CH_2$— or —$CH(CH_3)_2$—, or a bivalent linking group such as —S—, —$SO_2$—, —O—, —CO— or —N=N—; and k is 0 or 1.

A condensed phosphate of the formula (V) wherein the positions for $R^{11}$, $R^{15}$, $R^{16}$ and $R^{20}$ are blocked by an alkyl group having 1 to 4 carbon atoms, are particularly preferred, since it has a higher heat stability. It is preferred also from the viewpoint that the volatility is further decreased because of increase of the molecular weight.

Representative examples of the condensed phosphoric acid ester are, for instance, a compound of the formula (VI):

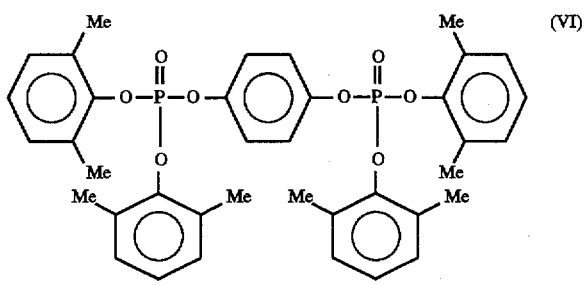

a compound of the formula (VII) (hereinafter referred to as "RBXP"):

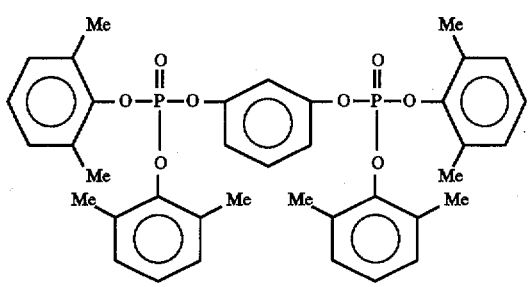

a compound of the formula (VIII):

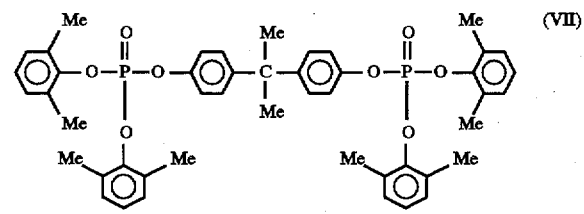

hydroquinonebis(diphenyl)phosphate, resorcinolbis(diphenyl)phosphate, bisphenol A bis(dicresyl)phosphate (hereinafter referred to as "BBCP"), and bisphenol A bis(diphenyl)phosphate. Among them, the compounds (VI) to (VIII) and BBCP are particularly preferable, since they are low in volatility and high in heat stability, and since deterioration of mechanical properties, heat resistance, moisture resistance and the like encountered in using a single flame retarder is a little when they are used with the surface-treated heterocyclic compound or its salt, thus molded articles of thermoplastic resins having a high flame resistance and good properties such as mechanical properties and heat resistance as estimated by heat distortion temperature can be obtained.

A sufficient flame resistance can be imparted to thermoplastic resins by using the surface-treated heterocyclic compound or its salt alone with maintaining the mechanical properties and the like at a much higher level as compared with the use of non-treated heterocyclic compound or its salt, but the combination use with a phosphorus based flame retarder is preferable for the reason mentioned above.

The phosphorus based flame retarder is used in an amount of 0 to 50% by weight, preferably 2 to 30% by weight, more preferably 5 to 20% by weight, based on a thermoplastic resin. When the amount is less than 2% by weight, the effects produced by the combination use such as improvements of flame resistance, molding processability and heat stability are not sufficiently obtained. If the amount is more than 50% by weight, the mechanical properties and heat resistance are remarkably lowered.

The ratio of the phosphorus based flame retarder to the additive of the present invention (i.e. surface-treated heterocyclic compound or its salt) varies depending on the kind of thermoplastic resins, the kind and level of properties such as flame resistance to be imparted to thermoplastic resins and the content of phosphorus atom in the phosphorus based flame retarder. In general, the phosphorus based flame retarder is used in an amount of 5 to 600 parts by weight, preferably 20 to 200 parts by weight, based on 100 parts by weight of the additive of the present invention, namely the surface-treated heterocyclic compound or its salt. If the amount of the phosphorus flame retarder is less than the above range, the advantages of the combination use such as a high degree of flame resistance and improvement in molding processability and heat stability are not sufficiently obtained. If the amount is more than the above range, the mechanical properties and heat resistance tend to deteriorate.

The additive of the present invention and a phosphorus based flame retarder may be previously mixed and added in the form of a mixture to a thermoplastic resin followed by mixing them, or they may be separately added to a thermoplastic resin and mixed therewith to form a resin composition. If the flame retarder is a liquid at ordinary temperature, the former mixing manner is desirable since it is easy to uniformly mix.

The total amount of the additive of the present invention and the phosphorus based flame retarder is preferably form 7 to 70% by weight, more preferably 15 to 50% by weight, based on a thermoplastic resin, though it varies depending on the kinds of heterocyclic compound and thermoplastic resin and the kind and level of characteristics such as flame resistance to be imparted to the thermoplastic resin. This amount is equal to or less than the amount required for obtaining the flame resistance on the same level by a single use of each of the additive of the present invention and the phosphorus based flame retarder. If the total amount is less than the above range, further improvement of properties such as flame resistance is not satisfactorily obtained. If the total amount is more than the above range, it is difficult to prevent deterioration of the properties that thermoplastic resins originally possess, while achieving a high flame resistance.

The additive of the present invention, namely the surface-treated heterocyclic compound or its salt or a mixture thereof with a flame retarder and/or usual other additives for plastics, can be incorporated into thermoplastic resins in usual manners, for example, by melt-blending with pellets of thermoplastic resins in an extruder or the like. The thus obtained thermoplastic resin composition can be molded into various articles such as sheet, pipe, bottle and other shaped articles. In view of excellent flame resistance and a balance thereof with other properties, the resin composition is suitably used for production of injection molded articles such as parts of household electric appliances and office automation devices.

The surface-treated heterocyclic compound or its salt, particularly its use with a phosphorus based flame retarder, is very useful for thermoplastic polyester resins.

The substantially the same results as those obtained by the surface-treated heterocyclic compound or its salt are obtained, even if the heterocyclic compound or its salt is incorporated into thermoplastic resins separately with the functional group-containing compound without previously treating the heterocyclic compound or its salt with the functional compound.

Thus, in another aspect, the present invention provides a flame retardant polyester resin composition comprising:
(A) a thermoplastic polyester,
(B) 2 to 50% by weight of a heterocyclic compound containing a nitrogen atom or its salt based on said polyester (A), (C) 0.1 to 50% by weight of a compound having at least two functional groups based on the component (B), and (D) 0 to 50% by weight of a phosphorus-based flame retarder based on said polyester (A).

The thermoplastic polyester (A) used in the present invention includes saturated polyesters formed from an acid component, e.g. a bivalent acid such as terephthalic acid or its derivative having an ester-forming ability, and a glycol component, e.g. a glycol having 2 to 10 carbon atoms, especially an alkylene glycol, other dihydric alcohols, or their derivatives having an ester-forming ability.

A polyalkylene terephthalate having at least 80% by mole of alkylene terephthalate units, e.g. polyethylene terephthalate or polybutylene terephthalate; an alkylene terephthalate copolymer composed of such an alkylene terephthalate and a component copolymerizable therewith such as a dicarboxylic acid or a diol; and a block copolymer of a polyethylene terephthalate and 1 to 30% by weight of units of a polyoxyalkylene compound, are preferably used from the viewpoint of good balance of properties such as processability, mechanical properties, electric properties and heat resistance.

The thermoplastic polyesters may be used alone or in admixture thereof.

Examples of the polyoxyalkylene compound included in the block copolymer are, for instance, a polyalkylene glycol such as polyethylene glycol, polypropylene glycol, polytetramethylene glycol or polyoxyethylene-polyoxypropylene random or block copolymer, and a modified polyoxyalkylene compound such as an addition product of an alkylene oxide (e.g. ethylene oxide, propylene oxide or tetramethylene oxide) to a bisphenol compound such as bisphenol A. The number average molecular weight of the polyoxyalkylene compound is usually from 500 to 2,000. The alkylene oxide addition product to a bisphenol compound is preferable, since the heat stability is good in copolymerization thereof with polyethylene terephthalate and lowering of the heat resistance is a little when the resin composition is formed into shaped articles.

Typical example of the bisphenol compound-alkylene oxide addition product is a compound of the formula (IV):

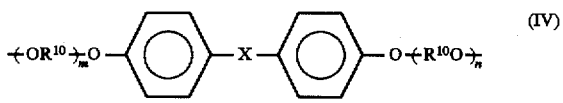

wherein $R^{10}$ is a bivalent hydrocarbon group having 2 to 4 carbon atoms such as —$CH_2CH_2$—, —$CH(CH_3)CH_2$— or —$(CH_2)_4$—, X is a single bond, an alkylene group having 1 to 3 carbon atoms such as —$CH_2$—, —$CH_2CH_2$— or —$C(CH_3)_2$—, or a bivalent bonding group such as —S—, —$SO_2$—, —O— or —CO—, m and n are independently an integer of 5 to 20, preferably 7 to 15, and the $R^{10}$ groups in respective units may be different.

Preferably, the thermoplastic polyester used in the present invention has an intrinsic viscosity of 0.4 to 1.2, especially 0.6 to 1.0, measured at 25° C. in a mixed solvent of phenol and tetrachloroethane in a ratio of 1:1 by weight. If the intrinsic viscosity is less than 0.4, the mechanical properties tend to deteriorate, and if the intrinsic viscosity is more than 1.2, the molding processability tends to deteriorate.

In the polyester composition according to the present invention, the nitrogen-containing heterocyclic compound or its salt (hereinafter referred to as "heterocyclic compound B" or "component B") serves to impart flame resistance to the polyester (A), and in addition, serves to improve electric properties, lubricity, plasticity, easiness of pigmentation, surface smoothness and dyability.

The heterocyclic compound (B) is used in an amount of 2 to 50% by weight, preferably 5 to 40% by weight, more preferably 10 to 30% by weight, based on the polyester (A).

Possible deterioration of mechanical properties heat resistance, moisture resistance and the like of the polyester (A) owing to incorporation of the heterocyclic compound (B) can be prevented or minimized by incorporating the functional group-containing compound (C) into the polyester (A) with the heterocylclic compound (B). The heterocyclic compound (B) may be previously treated with the functional compound (C) and the treated heterocyclic compound (B) be added to the polyester (A), or the components (B) and (C) may be separately added to the polyester (A).

The functional group-containing compound (C), is used in an amount of 0.1 to 50% by weight, preferably 0.5 to 30% by weight, based on the heterocyclic compound (B).

Known flame retarder may be optionally used in the polyester resin composition of the present invention. Phosphorus based flame retarders are preferred as stated before. The phosphorus based flame retarder (D) is used in an amount of 0 to 50% by weight, preferably 2 to 30% by weight, more preferably 5 to 20% by weight, based on the polyester (A).

Estimating a combination of the components (A), (B) and (C) from the viewpoint of favorably exhibiting the effects of the invention overall, preferred are a combination of polyethylene terephthalate, melamine cyanurate and an epoxy resin, a combination of polyethylene terephthalate, melamine cyanurate and a compound containing at least two acid anhydride groups, a combination of a copolymer of polyethylene terephthalate and 1 to 30% by weight of a polyoxyalkylene compound (especially bisphenol-modified polyoxyalkylene compound), melamine cyanurate and an epoxy resin, a combination of a copolymer of poyethylene terephthalate and 1 to 30% by weight of a polyoxyalkylene compound (especially bisphenol-modified polyoxyalkylene compound), melamine cyanurate and a compound containing at least two acid anhydride groups, a combination of polybutylene terephthalate, melamine cyanurate and an epoxy compound, a combination of a blend of polybutylene terephthalate and polyethylene terephthalate in a weight ratio of 70:30, melamine cyanurate and an epoxy resin, and the like.

In case of further using the phosphorus based flame retarder (D), it is preferable to use the above-mentioned condensed phosphoric acid ester, especially the compound shown by the formulas (V), the above-mentioned phosphate compound (e.g. monophosphoric acid triester such as triphenyl phosphate), the above-mentioned phosphonate compound, and red phosphorus with the above preferred combinations of the components (A), (B) and (C).

The polyester resin composition of the present invention may contain, as occasion demands, other flame retarders than the phosphorus based flame retarder, especially inorganic flame retarders such as Mg type, Zn type or Sn type flame retarders, flame retarding assistant, reinforcing agent, heat stabilizer, antioxidant, ultraviolet absorber, releasing agent, coloring agent, nucleating agent, antistatic agent, filler, lubricant, plasticizer, other polymers than thermoplastic polyester, and other inorganic or organic compounds.

The flame retardant resin composition of the present invention can be prepared in various manners. For example, the respective components and usual additives for polyester are added to and mixed in a usual mixing machine, and then melt-blended in an extruder. It is preferable to firstly mix the polyester (A) and the functional compound (C) and then mix them with the remaining components, since the operation is easy and the adhesion between the heterocyclic compound (B) and the functional compound (C) is hard to be impaired. If the phosphorus based flame retarder (D) is a liquid, it is preferable to add it at the time of melt-blending the components.

The heterocyclic compound (B) may be previously surface-treated with the functional compound (C), and the resultant is mixed with the polyester (A) and optionally the flame retarder (D). The surface-treated heterocyclic compound is used in an amount of 2 to 50% by weight, especially 5 to 40% by weight, more especially 10 to 30% by weight, based on the polyester (A).

The polyester resin composition of the present invention can be molded into various articles. Since the composition has an excellent flame resistance in spite of using a non-halogen flame retarder and also has well-balanced other properties, the composition is useful for production of injection moldings for use in electric and electronic parts of household electric appliances and office automation devices. In particular, the polyester resin composition of the invention is suitably used, utilizing excellent electric properties such as dielectric breakdown strength, arc resistance and tracking resistance, in breaker parts, switch parts, electric motor parts, ignition coil case, power supply plug, power supply receptacle, coil bobbin, connector terminal, fuse box and the like.

The present invention is more specifically described and explained by means of the following Examples, wherein all percents are by weight unless otherwise noted.

EXAMPLES 1 TO 3

There were mixed 3000 g of melamine cyanurate (average particle size 1 μm, molecular weight 255, nitrogen content 49.4%, decomposition temperature 450° C.) and 2%, based on the melamine cyanurate, of a bisphenol A type epoxy resin (commercially available under the trade mark "Epikote 828" made by Yuka Shell Epoxy Kabushiki Kaisha) for 5 minutes by a high speed mixer (trade mark "Super Mixer", product of Kawata Kabushiki Kaisha) to give a white powder of the treated melamine cyanurate (namely additive of the present invention).

To a mixture of a thoroughly dried polyethylene terephthalate (PET) having an intrinsic viscosity of 0.65 (measured at 25° C. in a mixed solvent of phenol and tetrachloroethane in a ratio of 1:1 by weight, hereinafter the same) and 10% (Example 1), 20% (Example 2) or 30% (Example 3) of the obtained white powder of the epoxy resin-treated melamine cyanurate were added 30% of a glass fiber (ECS-03 T-195H made by Nippon Electric Glass Co., Ltd.), 1% of talc, and 0.5% of an antioxidant [tetrakis(methylene-3,5-di-t-butyl-4-hydroxyhydrocinnamate)methane], respectively based on the PET. They were melt-blended at 280° C. in a vent-type extruder and pelletized. The obtained pellets were dried at 140° C. for 4 hours and molded by an injection molding machine (mold clamping pressure 50 tons) at a cylinder temperature of 280° C. and a mold temperature of 100° C. to give test specimens.

The flame resistance (UL-94 standard, thickness 1/16 inch), tensile strength (ASTM D-638), Izod impact value (ASTM D-256, notched), heat distortion temperature HDT (ASTM D-648, load 18.6 kg/cm$^2$) and moisture resistance (percent retention of tensile strength after allowing to stand at 90° C. and 100% RH for 72 hours) were measured using the obtained test specimens.

The results are shown in Table 1.

EXAMPLE 4

Melamine phosphate having an average particle size of 2 μm (trade mark "MPP-A", product of Kabushiki Kaisha Sanwa Chemical) was mixed with 2% of pyromellitic anhydride based on melamine phosphate for 5 minutes by a high speed mixer to give a white powder of treated melamine phosphate.

Test specimens were prepared in the same manner in Example 1 except that the thus obtained white powder of treated melamine phosphate was used in an amount of 20%.

The results are shown in Table 1.

EXAMPLE 5

The procedure of Example 1 was repeated except that the bisphenol A type epoxy resin was used in an amount of 5% instead of 2%.

To the obtained white powder was added an equal weight of a condensed phosphoric acid ester represented by the formula (VI) (phosphorus content 9.0%, acid value 0.2, melting point 169° C., white powder) and mixed in the same manner as above to give an additive composition according to the present invention in the form of a white powder.

Test specimens were prepared in the same manner as in Example 1 except that the obtained additive composition was added to a PET copolymer, namely a block copolymer of polyethylene terephthalate and 10% of a polyether (polyoxyethylene bisphenol A ether having a molecular weight of 1,000 and a bisphenol A/polyoxyethylene segment ratio of 0.06/1 by mole) in an amount of 20% based on the PET copolymer.

The results are shown in Table 1.

EXAMPLE 6

Melamine phosphate having an average particle size of 2 μm ("MPP-A" made by Kabushiki Kaisha Sanwa Chemical) was mixed with 2% of 2,2'-(1,3-phenylene)-bis(2-oxazoline) based on melamine phosphate for 5 minutes by a high speed mixer to give a white powder of treated melamine phosphate.

Test specimens were prepared in the same manner as in Example 5 using the thus obtained white powder of the treated melamine phosphate.

The results are shown in Table 1.

Comparative Example 1

The procedure of Example 1 was repeated except that the additive according to the present invention, namely the treated melamine cyanurate white powder, was not used.

The results are shown in Table 1.

Comparative Example 2

The procedure of Example 1 was repeated except that 20% of non-treated melamine cyanurate was used instead of 10% of the treated melamine cyanurate.

The results are shown in Table 1.

Comparative Example 3

The procedure of Example 5 was repeated except that non-treated melamine cyanurate was used instead of the treated melamine cyanurate.

The results are shown in Table 1.

pyromellitic anhydride were used instead of PBT and 5% of Epikote 828, respectively. The results are shown in Table 2.

EXAMPLE 9

Cyanuric acid (average particle size 5 μm) was treated with 2% of pyromellitic anhydride by mixing them for 5 minutes in a high speed mixer to give a white powder of treated cyanuric acid.

Test specimens were prepared in the same manner as in Example 7 except that a polyamide (PA) commercially available under the trade mark "AMILAN 1017" made by Toray Industries, Inc. was pelletized with 5% of the thus

TABLE 1

| | Components | | | | | | Izod | | | |
|---|---|---|---|---|---|---|---|---|---|---|
| | Thermo- | Treated heterocyclic compound | | | | Flame | Tensile | impact | | Moisture |
| | plastic resin | Heterocyclic compound | Functional compound | Amount (%) | Flame retarder | resistance (UL-94) | strength (kg/cm$^2$) | value (kg · cm/cm) | HDT (°C.) | resistance (%) |
| Ex.1 | PET | MC*$^1$ | Epoxy 2% | 10 | — | V-2 | 1586 | 8.5 | 222 | 86 |
| Ex.2 | PET | MC | Epoxy 2% | 20 | — | V-1 | 1579 | 8.4 | 221 | 84 |
| Ex.3 | PET | MC | Epoxy 2% | 30 | — | V-0 | 1358 | 7.6 | 218 | 81 |
| Ex.4 | PET | MP*$^2$ | Acid anhydride 2% | 20 | — | V-0 | 1461 | 8.2 | 217 | 77 |
| Ex.5 | PET copolymer | MC | Epoxy 5% | 10 | 10 | V-0 | 1400 | 12.0 | 220 | 80 |
| Ex.6 | PET copolymer | MP | Bisoxazoline 2% | 20 | — | V-0 | 1346 | 10.6 | 216 | 76 |
| Com. Ex.1 | PET | — | — | 0 | — | HB | 1592 | 8.5 | 222 | 87 |
| Com. Ex.2 | PET | MC | — | 20 | — | HB | 738 | 4.5 | 184 | 55 |
| Com. Ex.3 | PET copolymer | MC | — | 10 | 10 | V-1 | 933 | 6.5 | 193 | 65 |

(Notes)
*$^1$MC: Melamine cyanurate
*$^2$MP: Melamine phosphate

EXAMPLE 7

Melamine cyanurate (average particle size 1 μm) was mixed with 5% of a bisphenol A type epoxy resin (trade mark "Epikote 828", product of Yuka Shell Epoxy Kabushiki Kaisha) based on the melamine cyanurate for 5 minutes by a high speed mixer to give a white powder of treated melamine cyanurate (additive according to the present invention).

To a thoroughly dried polybutylene terephthalate (PBT) having an intrinsic viscosity of 0.85 were added 20% of the treated melamine cyanurate powder and 0.5% of an antioxidant [tetrakis(methylene-3,5-di-t-butyl-4-hydroxyhydrocinnamate)methane], and they were melt-blended at 250° C. by a vent type extruder and pelletized. The pellets were dried at 140° C. for 4 hours and molded by an injection molding machine (mold clamping pressure 50 tons) at a cylinder temperature of 250° C. and a mold temperature of 80° C. to give test specimens.

The flame resistance (LOI value, ASTM D-2863), tensile strength (ASTM D-638) and Izod impact value (ASTM D-256, notched) were measured using the obtained test specimens. The results are shown in Table 2.

EXAMPLE 8

The procedure of Example 7 was repeated except that a blend of PBT and PET in a weight ratio of 70:30 and 2% of treated cyanuric acid and 0.5% of the antioxidant at a melt-blending temperature of 240° C., and was injection-molded under standard molding conditions for polyamide, namely at a cylinder temperature of 230° C. and a mold temperature of 80° C.

The results are shown in Table 2.

EXAMPLE 10

Melamine phosphate (average particle size 2 μm, MPP-A made by Kabushiki Kaisha Sanwa Chemical) was treated with 2% of 2,2'-(1,3-phenylene)-bis(2-oxazoline) by mixing them for 5 minutes in a high speed mixer to give a white powder of treated melamine phosphate.

Test specimens were prepared in the same manner as in Example 7 except that a blend of polycarbonate (PC) and acrylonitrile-butadiene-styrene resin (ABS) (the blend being commercially available under the trade mark "TECHNIACE H270" made by Sumitomo Naugatuck Co. Ltd.) was pelletized with 10% of the treated melamine phosphate and 0.5% of the antioxidant at a melt-blending temperature of 270° C., and was injection-molded under standard conditions for the PC/ABS blend, namely at a cylinder temperature of 280° C. and a mold temperature of 90° C.

The results are shown in Table 2.

EXAMPLE 11

Melamine (average particle size 5 μm) was treated with 2% of Epikote 828 by mixing them for 5 minutes in a high speed mixer to give a white powder of treated melamine.

Test specimens were prepared in the same manner as in Example 7 except that a blend of polyphenylene oxide (PPO) and polystyrene (PS) (the blend being commercially available under the trade mark "NORYL 731J" made by Engineering Plastics Kabushiki Kaisha) was pelletized with 10% of the thus treated melamine powder and 0.5% of the antioxidant at a melt-blending temperature of 290° C., and was injection-molded under standard molding conditions for the PPO/PS blend, namely at a cylinder temperature of 280° C. and a mold temperature of 90° C.

The results are shown in Table 2.

Comparative Example 4

The procedure of Example 7 was repeated exept that the treated melamine cyanurate was not used. The results are shown in Table 2.

Comparative Example 5

The procedure of Example 7 was repeated except that non-treated melamine cyanurate was used instead of the treated melamine cyanurate. The results are shown in Table 2.

Comparative Example 6

The procedure of Example 9 was repeated except that non-treated cyanuric acid was used instead of the treated cyanuric acid. The results are shown in Table 2.

Table 3 as the nitrogen-containing heterocyclic compound (B), 1% of talc and 0.5% of an antioxidant [tetrakis (methylene-3,5-di-t-butyl-hydroxyhydrocinnamate) methane], respectively based on PET, by mixing them for 3 minutes in the ribbon blender. To the resulting mixture was added 30% of a glass fiber (fiber length 3 mm, diameter 11 μm, treated with aminosilane) based on the total amount therof, and they were melt-blended at 280° C. and pelletized by a vent type 45 mm diameter extruder.

The obtained pellets were dried at 140° C. for 4 hours and molded by an injection molding machine (mold clamping pressure 50 tons) at a cylinder temperature of 280° C. and a mold temperature of 100° C. to give test specimens.

The results of measurement of the physical properties are shown in Table 3, wherein the result "not-V" in flame resistance indicates failure to UL-94 standard.

EXAMPLE 19

The procedure of Example 13 was repeated except that 0.5% of pyromellitic anhydride was used as the functional compound (C) and 10% of a condensed phosphate RBXP was further used as the phosphorus based flame retarder (D). The results are shown in Table 3.

EXAMPLE 20

The procedure of Example 13 was repeated except that 0.5% of tolylene diisocyanate (trade mark "Colonate", product of Nippon Polyurethane Kabushiki Kaisha) was used as the functional compound (C) and 8% of tricresyl phosphate TCP (product of Daihachi Kagaku Kogyo Kabushiki Kaisha) was further used as the phosphorus based flame retarder (D). The results are shown in Table 3.

TABLE 2

| | Components | | | | | |
|---|---|---|---|---|---|---|
| Thermo-plastic resin | Treated heterocyclic compound | | Amount (%) | LOI (%) | Tensile strength (kg/cm²) | Izod impact value (kg · cm/cm) |
| | Heterocyclic compound | Functional compound | | | | |
| Ex.7 PBT | Melamine cyanurate | Epoxy 5% | 20 | 25.6 | 548 | 6.8 |
| Ex.8 PBT/PET | Melamine cyanurate | Acid anhydride 2% | 20 | 26.0 | 564 | 7.5 |
| Ex.9 PA | Cyanuric acid | Acid anhydride 2% | 5 | 31.2 | 829 | 4.1 |
| Ex.10 PC/ABS | Melamine phosphate | Bisoxazoline 2% | 10 | 30.4 | 600 | 44.3 |
| Ex.11 PPO/PS | Melamine | Epoxy 2% | 10 | 29.8 | 615 | 17.6 |
| Com. Ex.4 PBT | — | — | 0 | 19.6 | 560 | 7.0 |
| Com. Ex.5 PBT | Melamine cyanurate | — | 20 | 24.8 | 310 | 2.1 |
| Com. Ex.6 PA | Cyanuric acid | — | 5 | 30.1 | 746 | 3.0 |

EXAMPLES 12 TO 18

A thoroughly dried polyethylene terephthalate (PET) having an intrinsic viscosity of 0.65 was incorporated with a bisphenol A type epoxy resin (Epikote 828, product of Yuka Shell Epoxy Kabushiki Kaisha) of the amount shown in Table 3, based on PET, as the functional group-containing compound (C) by mixing them for 3 minutes in a ribbon blender, and then with melamine cyanurate (average particle size 1 μm, molecular weight 255, nitrogen content 49.4%, decomposition temperature 450° C.) of the amount shown in

EXAMPLE 21

The procedure of Example 13 was repeated except that 0.5% of polycarbodiimide (trade mark "STABACSOL PCD", product of Hiraizumi Yoko Kabushiki Kaisha) was used as the functional compound (C) and 0.3% of red phosphorus (trade mark "NOVA RED 120", product of Rin Kagaku Kogyo Kabushiki Kaisha) was further used as the phosphorus based flame retarder (D). The results are shown in Table 3.

EXAMPLE 22

The procedure of Example 13 was repeated except that 0.5% of diglycidyl terephthalate (trade mark "DENACOL EX-711", product of Nagase Kasei Kogyo Kabushiki Kaisha) was used as the functional compound (C) and 25% of bisphenol A bis(dicresyl)phosphate (BBCP) was further used as the flame retarder (D). The results are shown in Table 3.

EXAMPLE 23

The procedure of Example 13 was repeated except that a block copolymer of PET and 30% of bisphenol A-ethylene oxide adduct having a molecular weight of 1,000 and a bisphenol A/polyoxyethylene segment ratio of 0.06/1 by mole (this block copolymer being referred to as "copolymer I") was used as the thermoplastic polyester (A) and 10% of bisphenol A bis(dicresyl)phosphate (BBCP) was further used as the flame retarder (D). The results are shown in Table 3.

EXAMPLE 24

The procedure of Example 13 was repeated except that a block copolymer of PET and 10% of bisphenol A-ethylene oxide adduct having a molecular weight of 1, 000 and a bisphenol A/polyoxyethylene segment ratio of 0.06/1 by mole (this block copoymer being referred to as "copolymer II") was used as the thermoplastic polyester (A), 0.5% of bisoxazoline[2,2'-(1,3-phenylene)-bis(2-oxazoline)] was used as the functional compound (C) and 10% of a condensed phosphate RBXP was used as the flame retarder (D). The results are shown in Table 3.

Comparative Example 7

The procedure of Example 12 was repeated except that the heterocyclic compound (B) and the functional compound (C) were not used. The results are shown in Table 3.

Comparative Example 8

The procedure of Example 16 was repeated except that the functional compound (C) was not used. The results are shown in Table 3.

Comparative Example 9

The procedure of Example 16 was repeated except that the heterocyclic compound (B) was not used. The results are shown in Table 3.

Comparative Example 10

The procedure of Example 24 was repeated except that the functional compound (C) was not used. The results are shown in Table 3.

TABLE 3

| | Components | | | | | | | | |
|---|---|---|---|---|---|---|---|---|---|
| | Thermo-plastic polyester (A) | Heterocyclic compound (B) | Functional compound (C) | Flame retarder (D) | Flame resistance UL-94 | Tensile strength (kg/cm$^2$) | Izod impact value (kg · cm/cm) | HDT (°C.) | Moisture resistance (%) |
| Ex.12 | PET | MC*[1] 5% | Epoxy resin 2.5% | — | V-2 | 1588 | 8.8 | 212 | 92 |
| Ex.13 | PET | MC 10% | Epoxy resin 0.05% | — | V-2 | 1401 | 7.1 | 211 | 81 |
| Ex.14 | PET | MC 10% | Epoxy resin 0.5% | — | V-2 | 1535 | 8.2 | 216 | 87 |
| Ex.15 | PET | MC 10% | Epoxy resin 1.5% | — | V-2 | 1585 | 8.7 | 213 | 90 |
| Ex.16 | PET | MC 20% | Epoxy resin 1.0% | — | V-1 | 1528 | 8.0 | 214 | 85 |
| Ex.17 | PET | MC 30% | Epoxy resin 1.5% | — | V-0 | 1314 | 7.3 | 211 | 82 |
| Ex.18 | PET | MC 45% | Epoxy resin 2.5% | — | V-0 | 1308 | 7.1 | 203 | 84 |
| Ex.19 | PET | MC 10% | Acid anhydride 0.5% | RBXP 10% | V-0 | 1486 | 8.1 | 218 | 83 |
| Ex.20 | PET | MC 10% | Diisocyanate 0.5% | TCP 8% | V-0 | 1355 | 7.9 | 210 | 80 |
| Ex.21 | PET | MC 10% | Polycarbodiimide 0.5% | RP*[3] 0.3% | V-1 | 1524 | 8.0 | 212 | 88 |
| Ex.22 | PET | MC 10% | DGTP*[2] | BBCP 25% | V-0 | 1214 | 7.1 | 221 | 81 |
| Ex.23 | Copolymer I | MC 10% | Epoxy resin 0.5% | BBCP 10% | V-0 | 1387 | 8.5 | 226 | 80 |
| Ex.24 | Copolymer II | MC 10% | Bisoxazoline 0.5% | RBXP 10% | V-0 | 1314 | 7.6 | 212 | 78 |
| Com. Ex.7 | PET | — | — | — | not-V | 1592 | 8.5 | 222 | 87 |
| Com. Ex.8 | PET | MC 20% | — | — | not-V | 738 | 4.5 | 184 | 55 |
| Com. Ex.9 | PET | — | Epoxy resin 1.0% | — | not-V | 1590 | 8.6 | 219 | 90 |
| Com. Ex.10 | Copolymer II | MC 10% | — | RBXP 10% | V-1 | 933 | 6.5 | 193 | 65 |

(Notes)
*[1]MC: Melamine cyanurate
*[2]DGTP: Diglycidyl terephthalate
*[3]RP: Red phosphorus

EXAMPLE 25

A thoroughly dried polybutylene terephthalate (PBT) having an intrinsic viscosity of 0.85 was incorporated with 1.0% of a bisphenol A type epoxy resin (Epikote 828, product of Yuka Shell Epoxy Kabushiki Kaisha) based on PBT as the functional group-containing compound (C) by mixing them for 3 minutes in a ribbon blender, and then with 20% of melamine cyanurate (average particle size 1 μm) as the nitrogen-containing heterocyclic compound (B) and 0.5% of an antioxidant [tetrakis(methylene-3,5-di-t-butyl-hydroxyhydrocinnamate)-methane], respectively based on PBT, by mixing them for 3 minutes in the ribbon blender. The resulting mixture was melt-blended at 250° C. and pelletized by a vent type 30 mm diameter extruder.

The obtained pellets were dried at 140° C. for 4 hours and molded by an injection molding machine (mold clamping pressure 50 tons) at a cylinder temperature of 250° C. and a mold temperature of 80° C. to give test specimens.

The results of measurement of the physical properties are shown in Table 4.

EXAMPLE 26

The procedure of Example 25 was rpeated except that there were used a PBT/PET blend (70/30 by weight) as the thermoplastic polyester (A), 10% of melamine cyanurate as the nitrogen-containing heterocyclic compound (B), 0.5% of pyromellitic anhydride as the functional group-containing compound (C) and 10% of the condensed phosphate RBXP as the phosphorus based flame retarder (D).

The results are shown in Table 4.

Comparative Example 11

The procedure of Example 25 was repeated except that the heterocyclic compound (B) and the functional compound (C) were not used. The results are shown in Table 4.

Comparative Example 12

The procedure of Example 25 was repeated except that the heterocyclic compound (C) was not used. The results are shown in Table 4.

Dielectric breakdown strength (ASTM D-149, thickness of specimen 2 mm), arc resistance (ASTM D-495) and tracking resistance (IEC-112) were measured in addition to flame resistance, tensile strength, Izod impact resistance and HDT.

The results are shown in Table 5.

EXAMPLE 28

The procedure of Example 27 was repeated except that 10% of the phosphorus based flame retarder RBXP was further used. The results are shown in Table 5.

Comparative Example 13

The procedure of Example 27 was repeated except that 10% of a brominated polystyrene (trade mark "PYRO-CHEK68PB", product of FERRO Kabushiki Kaisha) and 3% of antimony trioxide (trade mark "PATOX-H", product of Nippon Seiko Kabushiki Kaisha) were used instead of melamine cyanurate and bishenol A type epoxy resin.

The results are shown in Table 5.

Comparative Example 14

A melamine-phenol resin powder (trade mark "National Light Melamine", product of Matsushita Electric Works, Ltd.) was molded by compression molding under conditions of mold temperature 160° C., molding pressure 150 kg/cm$^2$ and curing time 80 seconds to give test specimens.

The results of measurement of the physical properties of the specimens are shown in Table 5.

TABLE 4

| | Components | | | | Properties | | |
|---|---|---|---|---|---|---|---|
| | Thermoplastic polyester (A) | Heterocyclic compound (B) | Functional compound (C) | Flame retarder (D) | LOI (%) | Tensile strength (kg/cm$^2$) | Izod impact value (kg · cm/cm) |
| Ex. 25 | PBT | Melamine cyanurate 20% | Epoxy resin 1.0% | — | 25.7 | 538 | 6.7 |
| Ex. 26 | PBT/PET | Melamine cyanurate 10% | Acid anhydride 0.5% | RBXP 10% | 29.5 | 554 | 7.1 |
| Com. Ex. 11 | PBT | — | — | — | 19.6 | 560 | 7.0 |
| Com. Ex. 12 | PBT | Melamine cyanurate 20% | — | — | 24.8 | 310 | 2.1 |

EXAMPLE 27

The procedure of Example 12 was repeated except that the melamine cyanurate and the bisphenol A type epoxy resin were used in amounts of 15% and 1.5%, respectively.

TABLE 5

| | Composition | UL-94 | Tensile strength (kg/cm²) | Izod value (kg·cm/cm) | HDT (°C.) | Dielectric breakdown strength (KV/mm) | Arc resistance (sec) | Tracking resistance (V) |
|---|---|---|---|---|---|---|---|---|
| Ex. 27 | PET/melamine cyanurate 15%/epoxy resin 1.5% | V-1 | 1545 | 8.3 | 213 | 28 | 188 | 470 |
| Ex. 28 | PET/melamine cyanurate 15%/epoxy resin 1.5%/RBXP 10% | V-0 | 1424 | 7.7 | 227 | 27 | 185 | 450 |
| Com. Ex. 13 | PET/brominated polystyrene 10%/Sb₂O₃ 3% | V-0 | 1504 | 9.2 | 226 | 22 | 75 | 175 |
| Com. Ex. 14 | Melamine-phenol resin | V-0 | 550 | 3.4 | 184 | 9 | 184 | >650 |

In addition to the ingredients used in the Examples, other ingredients can be used in the Examples as set forth in the specification to obtain substantially the same results.

What we claim is:

1. An additive suitable for use in thermoplastic resins which comprises a heterocyclic compound or a salt thereof that is surface-treated with a compound having at least two functional groups, wherein said heterocyclic compound is at least one member selected from the group consisting of a compound of the formula (I):

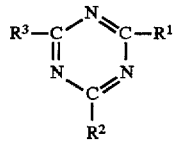

wherein $R^1$, $R^2$ and $R^3$ may be the same or different and each is hydrogen atom, amino group, an aryl group or a hydroxyalkyl group having 1 to 3 carbon atoms; a compound of the formula (II):

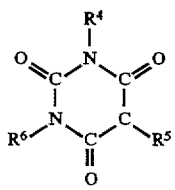

wherein $R^4$, $R^5$ and $R^6$ may be the same or different and each is hydrogen atom, amino group, an aryl group or a hydroxyalkyl group having 1 to 3 carbon atoms; and a compound of the formula (III):

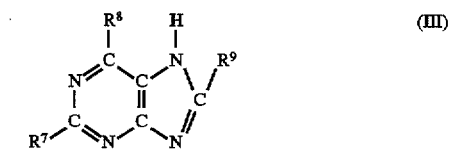

wherein $R^7$, $R^8$ and $R^9$ may be the same or different and each is hydrogen atom, amino group, hydroxyl group, mercapto group, an alkylamino group having 1 to 10 carbon atoms, anilino group, morpholino group, hydrazino group, benzylamino group, pyridylamino group, thenylamino group or a hydroxyalkyl group having 1 to 3 carbon atoms.

2. The additive of claim 1, wherein said salt is a salt of a basic said heterocyclic compound atom and an acidic said heterocyclic compound containing a nitrogen atom.

3. The additive of claim 1, wherein said salt is a salt of a basic said heterocyclic compound and an inorganic acid selected from the group consisting of phosphoric acid, phosphonic acid, phosphinic acid, sulfonic acid, sulfamic acid, silicic acid, polyphosphoric acid and polysilicic acid.

4. The additive of claim 1, which contains a phosphorus based flame retarder.

5. The additive of claim 1, wherein said salt is at least one member selected from the group consisting of melamine cyanurate and melamine phosphate.

6. The additive of claim 1, wherein the functional group of said compound having at least two functional groups is at least one member selected from the group consisting of epoxy group, carboxylic acid anhydride group, isocyanate group, oxazoline group, carbodiimido group, aldehyde group, carboxyl group, aziridinyl group and cyanate group.

7. The additive of claim 4, wherein said phosphorus based flame retarder is a condensed phosphoric acid ester of the formula (V):

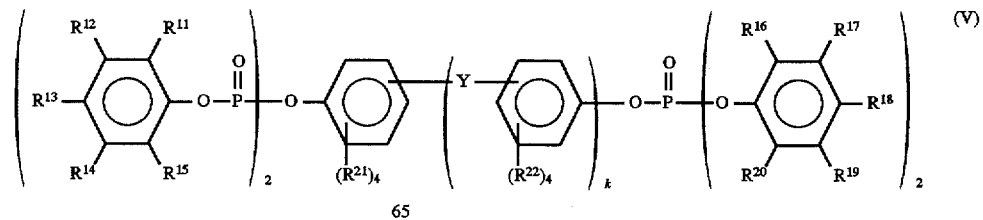

wherein $R^{11}$ to $R^{22}$ are independently hydrogen atom or an alkyl group having 1 to 4 carbon atoms, Y is a single bond, an alkylene group having 1 to 3 carbon atoms, —S—, —SO$_2$—, —O—, —CO— or —N=N—, and k is 0 or 1.

8. The additive of claim 1, wherein the amount of said compound having at least two functional groups is from 0.1 to 50% by weight based on said heterocyclic compound or said salt.

9. A flame retardant polyester resin composition comprising:
(A) a thermoplastic polyester,
(B) 2 to 50% by weight of a heterocyclic compound or a salt thereof based on said polyester (A), where said heterocyclic compound is at least one member selected from the group consisting of a compound of the formula (I)

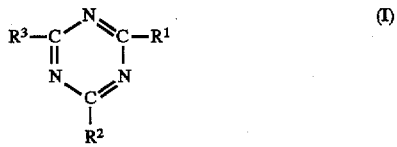

wherein $R^1$, $R^2$ and $R^3$ may be the same or different and each is hydrogen atom, amino group, an aryl group or a hydroxyalkyl group having 1 to 3 carbon atoms; a compound of the formula (II):

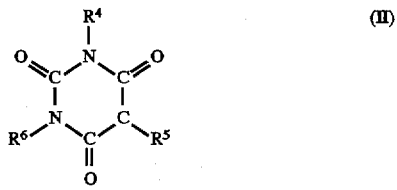

wherein $R^4$, $R^5$ and $R^6$ may be the same or different and each is hydrogen atom, amino group, an aryl group or a hydroxyalkyl group having 1 to 3 carbon atoms; and a compound of the formula (II):

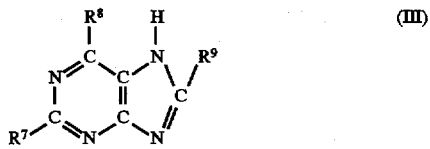

wherein $R^7$, $R^8$ and $R^9$ may be the same or different and each is hydrogen atom, amino group, hydroxyl group, mercapto group, an alkylamino group having 1 to 10 carbon atom, anilino group, morpholino group, hydrazino group, benzylamino group, pyridylamino group, thenylamino group or a hydroxyalkyl group having 1 to 3 carbon atoms,
(C) 0.1 to 50% by weight of a compound having at least two functional groups based on the component (B), and
(D) 0 to 50% by weight of a phosphorus-based flame retarder based on said polyester (A).

10. The composition of claim 9, wherein said salt in component (B) is a salt of a basic said heterocyclic compound and an acidic said heterocyclic compound containing a nitrogen atom.

11. The composition of claim 9, wherein said salt in component (B) is a salt of a basic said heterocyclic compound and an inorganic acid selected from the group consisting of phosphoric acid, phosphonic acid, phosphinic acid, sulfonic acid, sulfamic acid, silicic acid, polyphosphoric acid and polysilicic acid.

12. The composition of claim 9, wherein said salt in component (B) is at least one member selected from the group consisting of melamine cyanurate and melamine phosphate.

13. The composition of claim 9, wherein the functional group of said compound (C) is at least one member selected from the group consisting of epoxy group, carboxylic acid anhydride group, isocyanate group, oxazoline group, carbodiimido group, aldehyde group, carboxyl group, aziridinyl group and cyanate group.

14. The composition of claim 9, wherein said compound (C) is a diepoxy compound.

15. The composition of claim 9, wherein said thermoplastic polyester (A) is a polyalkylene terephthalate having at least 80% by mole of alkylene terephthalate units.

16. The composition of claim 9, wherein said thermoplastic polyester (A) is at least one member selected from the group consisting of a polyethylene terephthalate having at least 80% by mole of ethylene terephthalate units and a copolymer of units of said polyethylene terephthalate and 1 to 30% by weight of units of a polyoxyalkylene compound.

17. The composition of claim 16, wherein a unit of said polyoxyalkylene compound is a unit of the formula (IV):

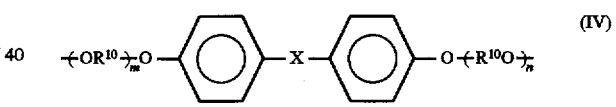

wherein $R^{10}$ is a bivalent hydrocarbon group having 2 to 4 carbon atoms, X is a single bond, an alkylene group having 1 to 3 carbon atoms, —S—, —SO$_2$—, —O— or —CO—, m and n are independently an integer of 5 to 20, and the $R^{10}$ groups in (m+n) units may be different.

18. The additive of claim 9, wherein said phosphorus based flame retarder (D) is a condensed phosphoric acid ester of the formula (V):

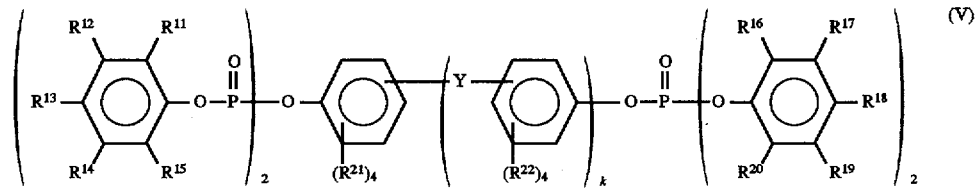

wherein $R^{11}$ to $R^{22}$ are independently hydrogen atom or an alkyl group having 1 to 4 carbon atoms, Y is a single bond, an alkylene group having 1 to 3 carbon atoms, —S—, —SO$_2$—, —O—, —CO— or —N=N—, and k is 0 or 1.

19. A flame retardant polyester resin composition comprising:

(A) a thermoplastic polyester, (B) 2 to 50% by weight of a heterocyclic compound or a salt thereof based on said polyester (A), where said heterocyclic compound is at least one member selected from the group consisting of a compound of the formula (I):

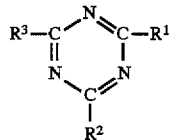

(I)

wherein $R^1$, $R^2$ and $R^3$ may be the same or different and each is hydrogen atom, amino group, an aryl group or a hydroxyalkyl group having 1 to 3 carbon atoms; a compound of the formula (II); and

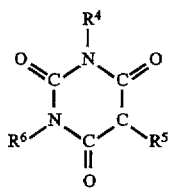

(II)

wherein $R^4$, $R^5$ and $R^6$ may be the same or different and each is hydrogen atom, amino group, an aryl group or a hydroxyalkyl group having 1 to 3 carbon atoms; and a compound of the formula (III):

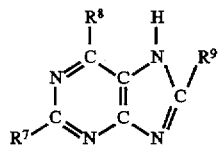

(III)

wherein $R^7$, $R^8$ and $R^9$ may be the same or different and each is hydrogen atom, amino group, hydroxyl group, mercapto group, an alkylamino group having 1 to 10 carbon atoms, anilino group, morpholino group, hydrazino group, benzylamino group, pyridylamino group, thenylamino group or a hydroxyalkyl group having 1 to 3 carbon atoms, (C) 0.1 to 50% by weight of at least one member selected from the group consisting of a diepoxy compound, a carboxylic acid dianhydride, a diisocyanate compound and a polycarbodiimide based on said component (B), and (D) 0 to 50% by weight of a condensed phosphoric acid ester of the formula (V):

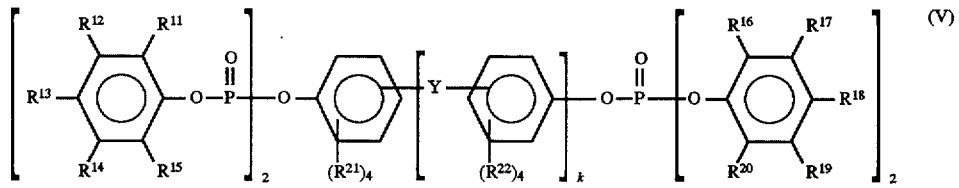

(V)

wherein $R^{11}$ to $R^{22}$ are independently hydrogen atom or an alkyl group having 1 to 4 carbon atoms, Y is a single bond, an alkylene group having 1 to 3 carbon atoms, —S—, —SO$_2$—, —O—, —CO— or —N=N—, and k is 0 or 1.

20. A process for preparing a flame retardant polyester resin composition comprising the steps of mixing a thermoplastic polyester with a compound having at least two functional groups, and mixing the resultant with a heterocyclic compound or a salt thereof and optionally other ingredients, wherein said composition comprises:

(A) said thermoplastic polyester, (B) 2 to 50% by weight of said heterocyclic compound or said salt based on said polyester (A), where said heterocyclic compound is at least one member selected from the group consisting of a compound of the formula (I):

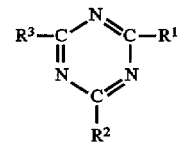

(I)

wherein $R^1$, $R^2$ and $R^3$ may be the same or different and each is hydrogen atom, amino group, an aryl group or a hydroxyalkyl group having 1 to 3 carbon atoms; a compound of the formula (II):

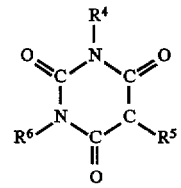

(II)

wherein $R^4$, $R^5$ and $R^6$ may be the same or different and each is hydrogen atom, amino group, an aryl group or a hydroxyalkyl group having 1 to 3 carbon atoms; and a compound of the formula (III):

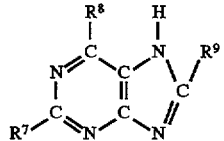

(III)

wherein $R^7$, $R^8$ and $R^9$ may be the same or different and each is hydrogen atom, amino group, hydroxyl group, mercapto group, an alkylamino group having 1 to 10 carbon atoms, anilino group, morpholino group, hydrazino group, benzylamino group, pyridylamino group, thenylamino group or a hydroxyalkyl group having 1 to 3 carbon atoms, (C) 0.1 to 50% by weight of said compound having at least two functional groups based on said component (B), and (D) 0 to 50% by weight of a phosphorus-based flame retarder based on said polyester (A).

21. An additive suitable for use in thermoplastic resins which comprises a core of an N-heterocyclic compound or a salt thereof that is coated in an amount of 0.1 to 50% by weight, based on said N-heterocyclic compound or a salt thereof, with a compound having at least two functional groups.

22. The additive of claim 21, wherein said N-heterocyclic compound is at least one member selected from the group consisting of a compound of the formula (I):

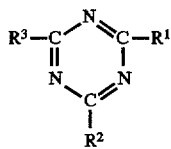
(I)

wherein $R^1$, $R^2$ and $R^3$ may be the same or different and each is hydrogen atom, amino group, an aryl group or a hydroxyalkyl group having 1 to 3 carbon atoms; a compound of the formula (II):

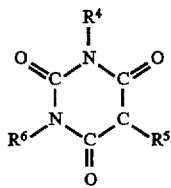
(II)

wherein $R^4$, $R^5$ and $R^6$ may be the same or different and each is hydrogen atom, amino group, an aryl group or a hydroxyalkyl group having 1 to 3 carbon atoms; and a compound of the formula (III):

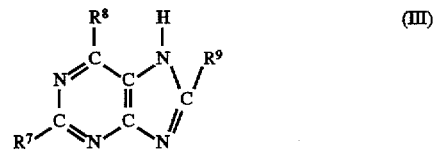
(III)

wherein $R^7$, $R^8$ and $R^9$ may be the same or different and each is hydrogen atom, amino group, hydroxyl group, mercapto group, an alkylamino group having 1 to 10 carbon atoms, anilino group, morpholino group, hydrazino group, benzylamino group, pyridylamino group, thenylamino group or a hydroxyalkyl group having 1 to 3 carbon atoms.

* * * * *